United States Patent
Arai et al.

(10) Patent No.: US 7,212,906 B2
(45) Date of Patent: *May 1, 2007

(54) FOLLOW RUNNING CONTROL SYSTEM

(75) Inventors: Toshiaki Arai, Utunomiya (JP); Tadayoshi Okada, Shioya-gun (JP); Hisaya Izawa, Utunomiya (JP); Makoto Matsumoto, Utunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 11/013,029

(22) Filed: Dec. 14, 2004

(65) Prior Publication Data

US 2005/0187697 A1    Aug. 25, 2005

(30) Foreign Application Priority Data

Feb. 19, 2004   (JP)   ............................. 2004-042928

(51) Int. Cl.
    G06F 7/00      (2006.01)
    B60K 31/00     (2006.01)

(52) U.S. Cl. ........................................ 701/96; 340/903
(58) Field of Classification Search ...................... None
    See application file for complete search history.

(56) References Cited

U.S. PATENT DOCUMENTS 4,670,845 A * 6/1987 Etoh ........................... 701/301
5,153,559 A * 10/1992 Atsumi ........................ 340/435
5,529,139 A * 6/1996 Kurahashi et al. .......... 180/169
5,969,969 A * 10/1999 Ejiri et al. ..................... 701/41
6,298,298 B1 * 10/2001 Tange et al. ................... 701/96
6,876,915 B2 * 4/2005 Kuramochi et al. ........... 701/96
7,177,749 B2 * 2/2007 Sekiguchi ..................... 701/96
2004/0249548 A1 * 12/2004 Sawamoto .................... 701/96

FOREIGN PATENT DOCUMENTS

| JP | 08-293100   | * 11/1996 |
| JP | 10-147160   |   6/1998  |
| JP | 2000-161950 | *  6/2000 |
| JP | 2001-322447 | * 11/2001 |

* cited by examiner

*Primary Examiner*—Michael J. Zanelli
(74) *Attorney, Agent, or Firm*—O'Melveny & Myers LLP

(57) ABSTRACT

A follow running control system includes a running control section for performing running control of the present vehicle based on data of the preceding vehicle and a signal from a device for detecting a driving operation performed by a driver of the present vehicle. If a driving operation by the driver for requesting starting of the present vehicle is detected while the present vehicle is stopped in a stop control state, the running control section changes a control state of the present vehicle, with respect to a follow running control device for controlling follow running of the present vehicle based on a target speed of the vehicle, from the stop control state to a follow control state for following the preceding vehicle, regardless of starting of preceding vehicle.

26 Claims, 7 Drawing Sheets

FOLLOW RUNNING CONTROL SYSTEM

BACKGROUND OF THE INVENTION

1. Field of the Invention

The present invention relates to a follow running control system for performing follow running control in which a target vehicle followed by the present vehicle is determined.

Priority is claimed on Japanese Patent Application No. 2004-042928, filed Feb. 19, 2004, the content of which is incorporated herein by reference.

2. Description of the Related Art

In a known follow running control system, in order to save labor for the driver's operation, a vehicular gap sensor for determining the distance between the present vehicle and the vehicle in front (i.e., the preceding vehicle) is provided for controlling the running state of the present vehicle so as to secure a specific gap between vehicles, thereby performing starting, stopping, and running operations while following the preceding vehicle (see, for example, Japanese Unexamined Patent Application, First Publication No. Hei 10-147160). Such a follow running control system may have a communication device for communicating the advance of the preceding vehicle while the present vehicle waits for a signal at the intersection or stops on a jammed road, and for urging starting of the present vehicle. In this case, even when the road is crowded by a number of vehicles, a burden on the driver for paying attention to the forward direction is reduced, and the driver is relieved of complicated operations such as repeatedly starting and stopping again and again.

In conventional systems, driving operation by the driver of the present vehicle for advancing the vehicle is not effective until detecting the advance of the preceding vehicle. Therefore, a difference in driving sensation is produced between running by the driver's manual operation and follow running by the follow running control system, so that the driver may feel uncomfortable.

More specifically, in detection of the advance of the preceding vehicle, the distance to the preceding vehicle or a change in relative speed with respect to the preceding vehicle is determined by referring to signals of a radar or the like for detecting the preceding vehicle; thus, starting of the preceding vehicle cannot be detected until the preceding vehicle is actually started. However, the driver can recognize situations in which the signal in front is changed from red to green and thus vehicles can start or that another vehicle in front of the preceding vehicle has been started. Therefore, the driver can judge that the preceding vehicle is just going to start and can start to release the brake pedal. Accordingly, a difference in driving sensation is produced between running by the driver's natural operation and follow running by the follow running control system.

SUMMARY OF THE INVENTION

In consideration of the above circumstances, an object of the present invention is to provide a follow running control system for smoothly controlling follow running in consideration of the driver's operation performed according to changes in traffic situations around the present vehicle.

Therefore, the present invention provides a follow running control system comprising:

an object detecting device (e.g., a radar apparatus in the embodiment), provided in a present vehicle (e.g., a vehicle 1 in an embodiment explained below), for detecting objects in an advance direction of the present vehicle;

a preceding vehicle determining device (e.g., a preceding vehicle determining unit included in a target determining section 16 in the embodiment) for determining a preceding vehicle (e.g., a preceding vehicle 41 in the embodiment) to be followed by the present vehicle from among the detected objects;

a target vehicular gap determining device (e.g., a target vehicular gap determining section 18 in the embodiment) for determining a target vehicular gap between the present vehicle and the preceding vehicle;

a target speed determining device (e.g., a target speed determining section 19 in the embodiment) for determining a target speed of the present vehicle based on a signal from the object detecting device and the target vehicular gap;

a follow running control device (e.g., a throttle control section 13, a brake control section 14, and a brake fluid pressure determining section 15 in the embodiment) for controlling follow running of the present vehicle based on the determined target speed;

a preceding vehicle starting detecting device (e.g., a preceding vehicle starting detecting unit included in the target determining section 16 in the embodiment) for detecting starting of the preceding vehicle based on a signal from the object detecting device;

a driving operation detecting device (e.g., a starting/stopping switch 25 or an accelerator pedal in the embodiment) for detecting a driving operation performed by a driver of the present vehicle;

a running control section (e.g., a control state determining section 17 in the embodiment) for performing running control of the present vehicle based on data of the preceding vehicle and a signal from the driving operation detecting device, wherein if a driving operation by the driver for requesting starting of the present vehicle is detected while the present vehicle is stopped in a stop control state, the running control section changes a control state of the present vehicle, with respect to the follow running control device, from the stop control state to a follow control state for following the preceding vehicle, regardless of starting of preceding vehicle.

According to the follow running control system having the above structure, when the driver requests starting of the present vehicle, the follow control with respect to the preceding vehicle is possible even before the advance of the preceding vehicle. Therefore, follow control while giving the driver's driving operation priority is possible. Accordingly, a stand-by state is realized in which follow control is possible for the starting of the preceding vehicle; thus, at the same time the preceding vehicle starts, the present vehicle can be smoothly started by making the present vehicle follow the preceding vehicle.

Therefore, a difference in driving sensation between running of the vehicle by the driver's natural operation and follow running by the follow running control system is reduced, and it is possible to realize a follow running control system by which the driver does not feel uncomfortable.

The follow running control system may further comprise a communicating device (e.g., a communication section 12 in the embodiment, and refer to steps S2 and S3 performed by the control state determining section 17 in the embodiment) for communicating starting of the preceding vehicle if the starting of the preceding vehicle is detected while the present vehicle is stopped in the stop control state.

Accordingly, when starting or advance of the preceding vehicle is detected by the preceding vehicle starting detecting device, the communicating device communicates the starting of the preceding vehicle, so that the state in which the preceding vehicle has just started is communicated, thereby urging the driver to input (indication of) the next driving operation. Therefore, even if the driver does not recognize changes in traffic situations around the present vehicle, the driver, informed of the starting of the preceding vehicle, can be urged to input the next driving operation. At the same time the preceding vehicle starts, the present vehicle can be smoothly started by making the present vehicle follow the preceding vehicle.

Preferably, even if the starting of the preceding vehicle is detected while the present vehicle is stopped in the stop control state, the communicating device prohibits communicating the starting of the preceding vehicle in a predetermined time period after the driving operation by the driver for requesting starting of the present vehicle is detected.

Also in this case, when starting of the preceding vehicle is detected, the communicating device communicates the starting of the preceding vehicle, thereby urging the driver to input indication of the next driving operation. However, if the (next) driving operation for requesting starting of the present vehicle has already been input and designated by the driver, communication of the starting of the preceding vehicle can be prohibited, thereby stopping the operation of urging the driver to input the next driving operation. Accordingly, when the driver recognizes changes in traffic situations around the present vehicle, the present vehicle can be smoothly started the moment the preceding vehicle starts or advances, by following the preceding vehicle without inconveniencing the driver.

Also preferably, if the starting of the preceding vehicle is not detected in a predetermined time after the change of the control state of the present vehicle from the stop control state to the follow control state, the running control section changes the control state of the present vehicle from the follow control state to the stop control state.

Also in this case, if starting or advance of the present vehicle is requested in the stop control state by the driver, the follow control with respect to the preceding vehicle is possible. However, if starting of the preceding vehicle is not detected in a predetermined time, the running control section changes the control state of the present vehicle (with respect to the follow running control device) from the follow control state to the stop control state, thereby maintaining the stopped state of the present vehicle. Accordingly, even when the driving operation for requesting starting of the present vehicle has been designated by the driver, if the preceding vehicle does not start, the control state of the present vehicle can be returned to the stop control state after a specific time has elapsed from the designation of the driver for requesting starting of the present vehicle. Therefore, even when the driver has the intention of starting the vehicle, if the preceding vehicle is not started, the stopping state of the present vehicle is maintained, thereby realizing a follow running control system for appropriately making the present vehicle run in accordance with traffic situations around the vehicle.

It is possible that:

the driving operation detecting device has an operation device (e.g., a starting/stopping switch 25 in the embodiment) for selectively inputting either a driving operation for requesting starting or a driving operation for requesting stopping according to the control state of the present vehicle; and the running control section changes the control state of the present vehicle from the follow control state to the stop control state if the driving operation for requesting stopping is input via the operation device by the driver in a predetermined time after the change of the control state of the present vehicle from the stop control state to the follow control state.

Also in this case, if starting or advance of the present vehicle is requested in the stop control state by the driver, the follow control with respect to the preceding vehicle is possible. However, if the driving operation for requesting stopping is input via the operation device (for selectively inputting either the driving operation for requesting starting or the driving operation for requesting stopping according to the control state of the present vehicle) by the driver, the operation of the driver is given priority and the control state of the present vehicle (with respect to the follow running control device) is changed from the follow control state to the stop control state, thereby maintaining the stopped state of the present vehicle. Accordingly, even when the preceding vehicle is started, if the present vehicle cannot be started to follow the preceding vehicle, the stopping state of the present vehicle is maintained based on the driving operation (i.e., indication) by the driver. Accordingly, a difference in driving sensation between running of the vehicle by the driver's natural operation and follow running by the follow running control system is reduced, and it is possible to realize a follow running control system by which the driver does not feel uncomfortable.

The driving operation detecting device may detect the driving operation performed by the driver based on a signal from a switch (e.g., switches 10 in the embodiment) provided close to a steering wheel (e.g., a steering wheel 31 in the embodiment) of the present vehicle. Accordingly, the driver can input the driving operation with no stress by using switches provided close to the steering wheel, thereby realizing a follow running control system by which the driver is relieved of stress.

The follow running control system may further comprise:

a speed measuring device (e.g., a speed sensor 3 in the embodiment) for measuring a speed of the present vehicle;

a yaw rate measuring device (e.g., a yaw rate sensor 4 in the embodiment) for measuring a yaw rate of the present vehicle; and a running locus computing device (e.g., a running locus computing unit included in the target determining section 16 in the embodiment) for computing a running locus of the present vehicle based on signals output from the speed measuring device and the yaw rate measuring device, wherein:

the preceding vehicle determining device determines the preceding vehicle based on signals from the object detecting device and the running locus computing device.

In this structure, the running locus computing device can easy compute the corner R (i.e., the radius of curvature at each corner) of the road on which the present vehicle is running by dividing the running speed of the present vehicle (measured by the speed detecting device) by the yaw rate of the present vehicle (measured by the yaw rate detecting device), thereby computing the running locus of the present vehicle. The computed running locus and data of the objects in the advance direction of the present vehicle (which is detected by the object detecting device) are compared with each other, so that the preceding vehicle determining device can accurately recognize a vehicle on an extension of the running locus of the present vehicle as the preceding vehicle via simple processing (performed by the running locus computing device). Therefore, it is possible to realize a small-sized follow running control system, appropriately provided in the vehicle, for accurately following the preceding vehicle with less power consumption.

DETAILED DESCRIPTION OF THE INVENTION

Hereinafter, embodiments according to the present invention will be explained with reference to the drawings.

Structure of the System

Figure 1:
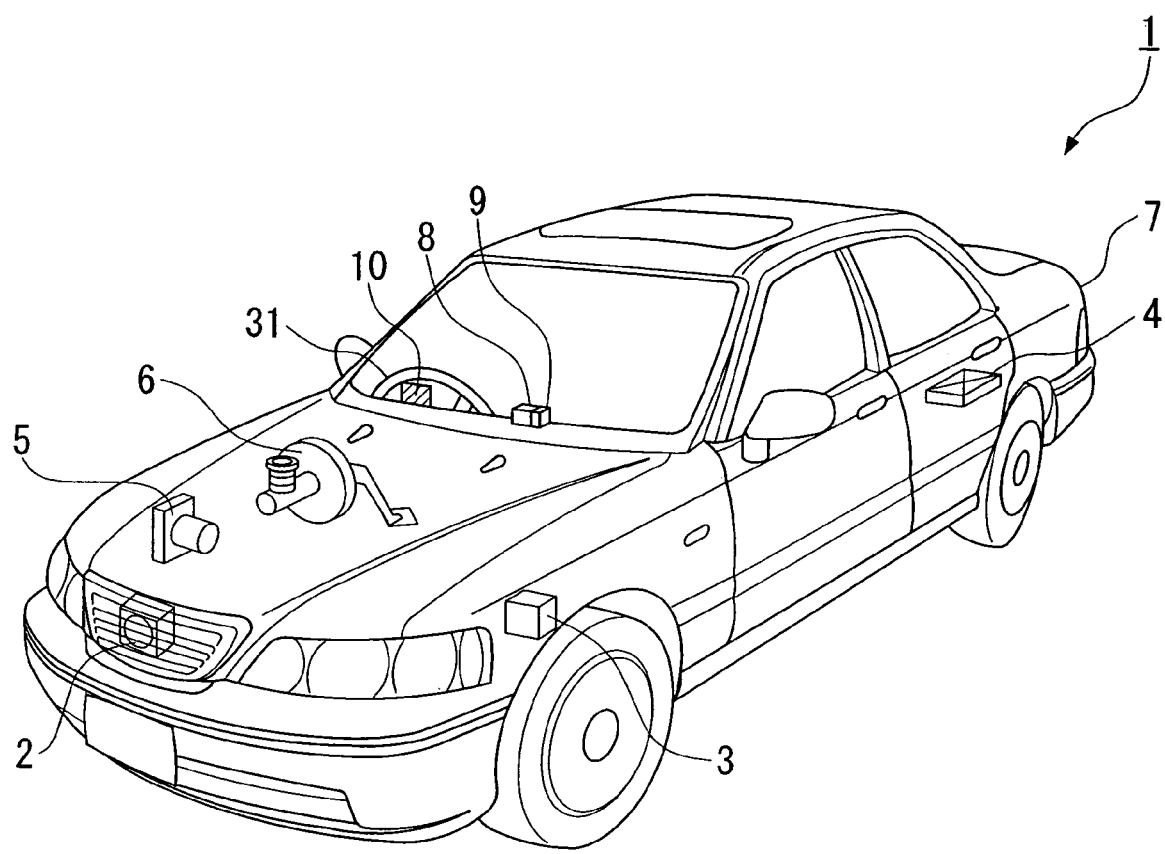
FIG. 1 is a perspective view showing a vehicle in which an embodiment of the follow running control system of the present invention is provided.
Figure 2:
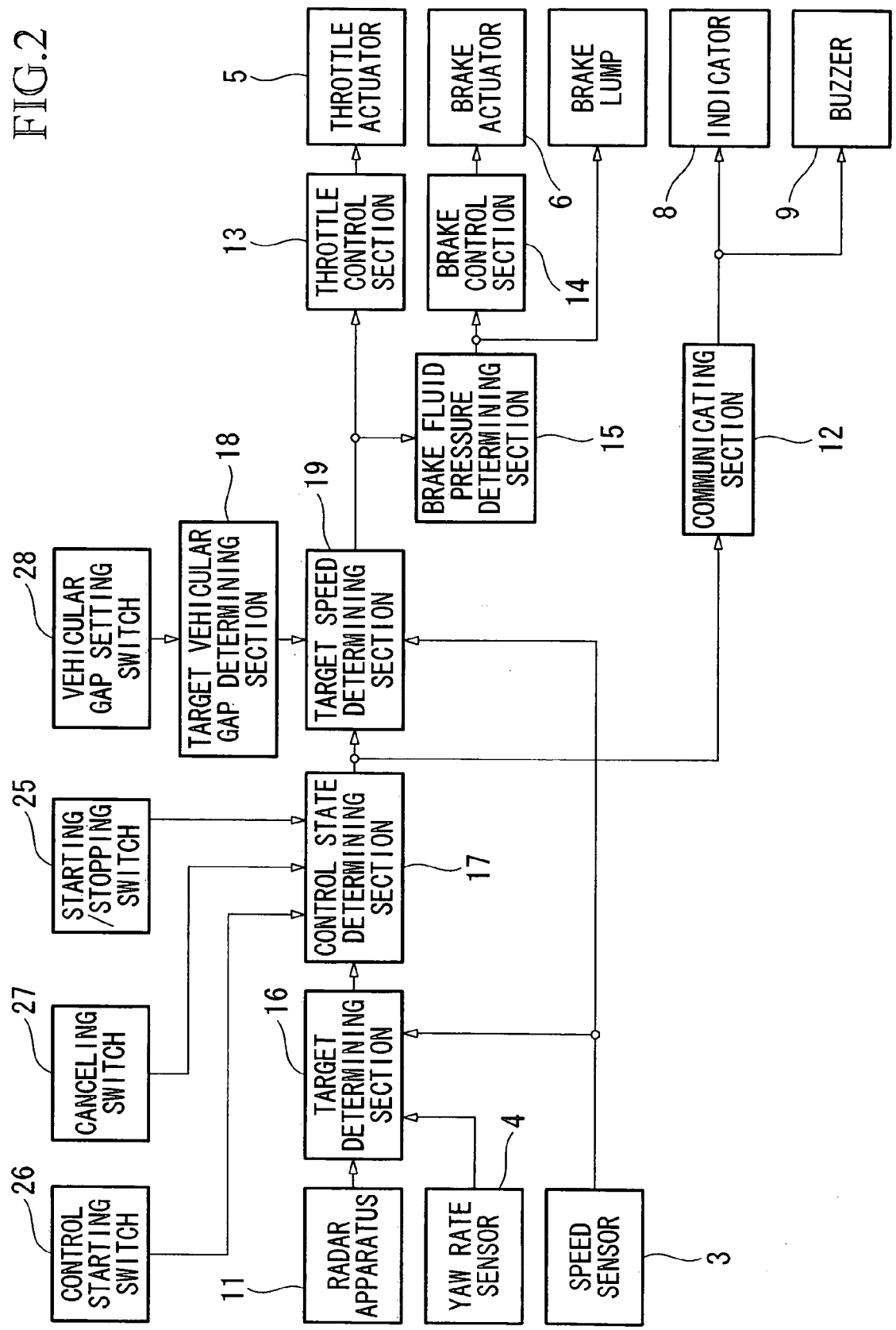
FIG. 2 is a block diagram for showing the structure of the follow running control system in the embodiment.

FIG. 1 is a perspective view showing a vehicle 1 in which an embodiment of the follow running control system of the present invention is provided. FIG. 2 is a block diagram for showing the structure of this follow running control system.

In FIG. 1, the follow running control system of the present embodiment is generally constructed as a millimeter-wave radar integrated ECU (electronic control section) 2. The vehicle 1 has a speed sensor 3 for measuring the running speed of the vehicle 1, and a yaw rate sensor 4 for measuring the yaw rate of the vehicle 1. The measured speed and yaw rate are input into the millimeter-wave radar integrated ECU 2 (i.e., the follow running control system).

The vehicle 1 also includes a throttle actuator 5 for operating the throttle for the engine of the vehicle 1 via oil pressure or electricity, and a brake actuator 6 for operating the brake of the vehicle 1, also via oil pressure or electricity.

At the rear side of the vehicle 1, a brake lamp 7 for indicating the operation state of the brake of the vehicle 1 is provided. Near the driver's seat of the vehicle 1, an indicator 8 and a buzzer 9 are provided for informing the driver of the control state of the follow running control system. Near a steering wheel 31, switches 10, operated by the driver, are provided for inputting the driving operation for the follow running control system.

The structure of the millimeter-wave radar integrated ECU 2 (i.e., the follow running control system) will be explained in detail by referring to FIG. 2. Reference numeral 11 indicates a radar apparatus for sending a radar wave to the surroundings of the vehicle 1 and receiving waves reflected by an object. This radar apparatus 11 is provided at the front side of the vehicle 1 and detects an object in front of the vehicle 1 by using the received reflected waves.

The follow running control system of the present embodiment has a processing section realized in the ECU section of the millimeter-wave radar integrated ECU 2, which includes a CPU (central processing section). Specifically, the processing section includes a communicating section 12, a throttle control section 13, a brake control section 14, a brake fluid pressure determining section 15, a target determining section 16, a control state determining section 17, a target vehicular gap determining section 18, and a target speed determining section 19.

The communicating section 12 informs the driver of the control state of the follow running control system, by using the indicator 8 or the buzzer 9 provided near the driver's seat.

The throttle control section 13 determines the degree of opening of the throttle and controls the throttle actuator 5 for operating the throttle for the engine of the vehicle 1.

The brake control section 14 controls the brake actuator 6 for operating the brake of the vehicle 1. The control of the brake actuator 6 by the brake control section 14 is performed based on a target fluid pressure (i.e., a target hydraulic pressure) of the brake fluid, which is determined by the brake fluid pressure determining section 15. In addition, the on/off state of the brake lamp 7, provided at the rear side of the vehicle 1, is also controlled according to the target fluid pressure of the brake fluid determined by the brake fluid pressure determining section 15.

The target determining section 16 processes data of an object in front of the vehicle 1, which is detected by the radar apparatus 11. The target determining section 16 has a running locus computing unit for computing the running locus of the vehicle 1 (i.e., the running locus of the present vehicle) by referring to the speed and the yaw rate of the vehicle 1 measured by the speed sensor 3 and the yaw rate sensor 4. The target determining section 16 also has a preceding vehicle determining unit for (i) detecting a preceding vehicle followed by the present vehicle 1 according to the computed running locus of the present vehicle and the data of objects in front of the vehicle 1 output from the radar apparatus 11, and (ii) for computing object data which include the distance between the detected preceding vehicle and the vehicle 1 and the relative speed between the preceding and present vehicles. The target determining section 16 also has a preceding vehicle starting detecting unit for detecting the starting of the preceding vehicle by determining whether the preceding vehicle has moved from the stopped state.

For example, the preceding vehicle determining unit recognizes a vehicle on an extension of the running locus of the present vehicle as the preceding vehicle by dividing the speed of the vehicle 1 by the yaw rate of the vehicle 1 so as to compute the corner R (i.e., the radius of curvature at each corner) of the road on which the vehicle 1 is running and determine the running locus of the present vehicle. The preceding vehicle determining unit also recognizes stationary objects provided along a side of the traffic lane, such as a cat's eye or a white stripe, so as to determine the lane on which the vehicle 1 is running, thereby distinguishing the preceding vehicle on the lane on which the vehicle 1 is running from vehicles in the next lane. In addition, if the present vehicle is stopped, the preceding vehicle determining unit distinguishes the preceding vehicle from the other vehicles by referring to the running locus of the present vehicle computed before the stopping of the vehicle.

The control state determining section 17 performs running control of the vehicle 1 based on (i) the signal from a switch among the switches 10 provided for the driver who inputs the driving operation, where the switches 10 include a starting/stopping switch 25 for the driver who inputs the intention of the starting or stopping operation, a control starting switch 26 for inputting the intention of starting the follow running control, and a canceling switch 27 for inputting the intention of canceling the follow running control, and (ii) data of the object input from the target determining section 16. The control state determining section 17 also informs the driver of the control state via the communicating section 12. The running control of the vehicle 1 is performed based on the transition between three states OFF, FOLLOW-UP, and HOLD STOP STATE. The state transition in the running control of the vehicle 1 by the control state determining section 17 will be explained below in detail.

The target vehicular gap determining section 18 determines a target distance between the vehicle 1 controlled by the follow running control system and the preceding vehicle (i.e., the target vehicular gap), based on the driver's operation input via a vehicular gap setting switch 28 among the switches 10 (provided for the driver who inputs the driving operation).

The target speed determining section 19 computes a target speed which is an optimum speed for the vehicle 1 based on the control state determined by the control state determining section 17 and the target vehicular gap determined by the target vehicular gap determining section 18. In order that the vehicle 1 runs at the target speed, the target speed determining section 19 controls the throttle control section 13 and the brake fluid pressure determining section 15.

Specifically, when the target speed is higher than the present speed of the vehicle 1, the target speed determining section 19 commands the throttle actuator 5 to increase the degree of opening of the throttle, which is output from the throttle control section 13, so as to increase the engine speed and accelerate vehicle 1. When the target speed is lower than the present speed of the vehicle 1, the target speed determining section 19 commands the brake actuator 6 to increase the target fluid pressure of the brake fluid, which is output from the brake fluid pressure determining section 15, so as to make the brake control section 14 operate the brake.

Figure 3:
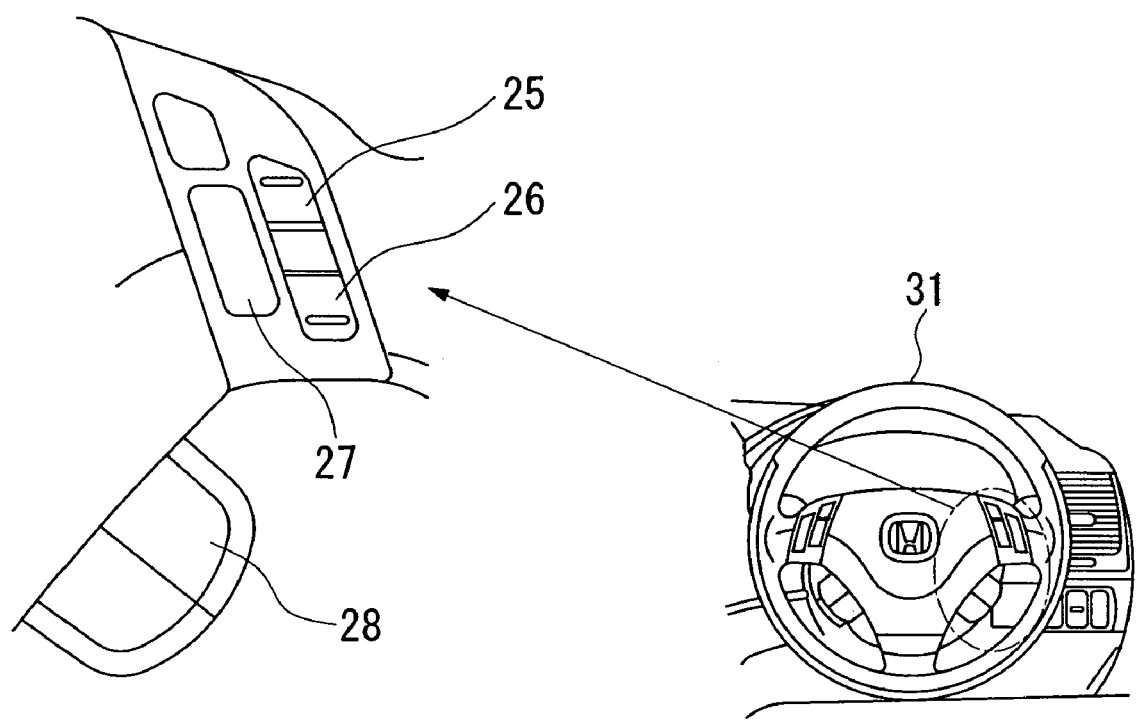
FIG. 3 shows an example of the layout for the starting/stopping switch, the control starting switch, the canceling switch, and the vehicular gap setting switch of the follow running control system in the embodiment.

FIG. 3 shows an example of the layout for the above-explained starting/stopping switch 25, the control starting switch 26, the canceling switch 27, and the vehicular gap setting switch 28. Each switch is provided close to the steering wheel 31 for the driver's smooth operation. Here, operation switches of the cruise control provided in the vehicle 1 may also serve as the starting/stopping switch 25, the control starting switch 26, the canceling switch 27, and the vehicular gap setting switch 28.

Transition of Control State

Hereinbelow, the state transition of the running control by the control state determining section 17 will be explained by referring to the drawings.

Figure 4:
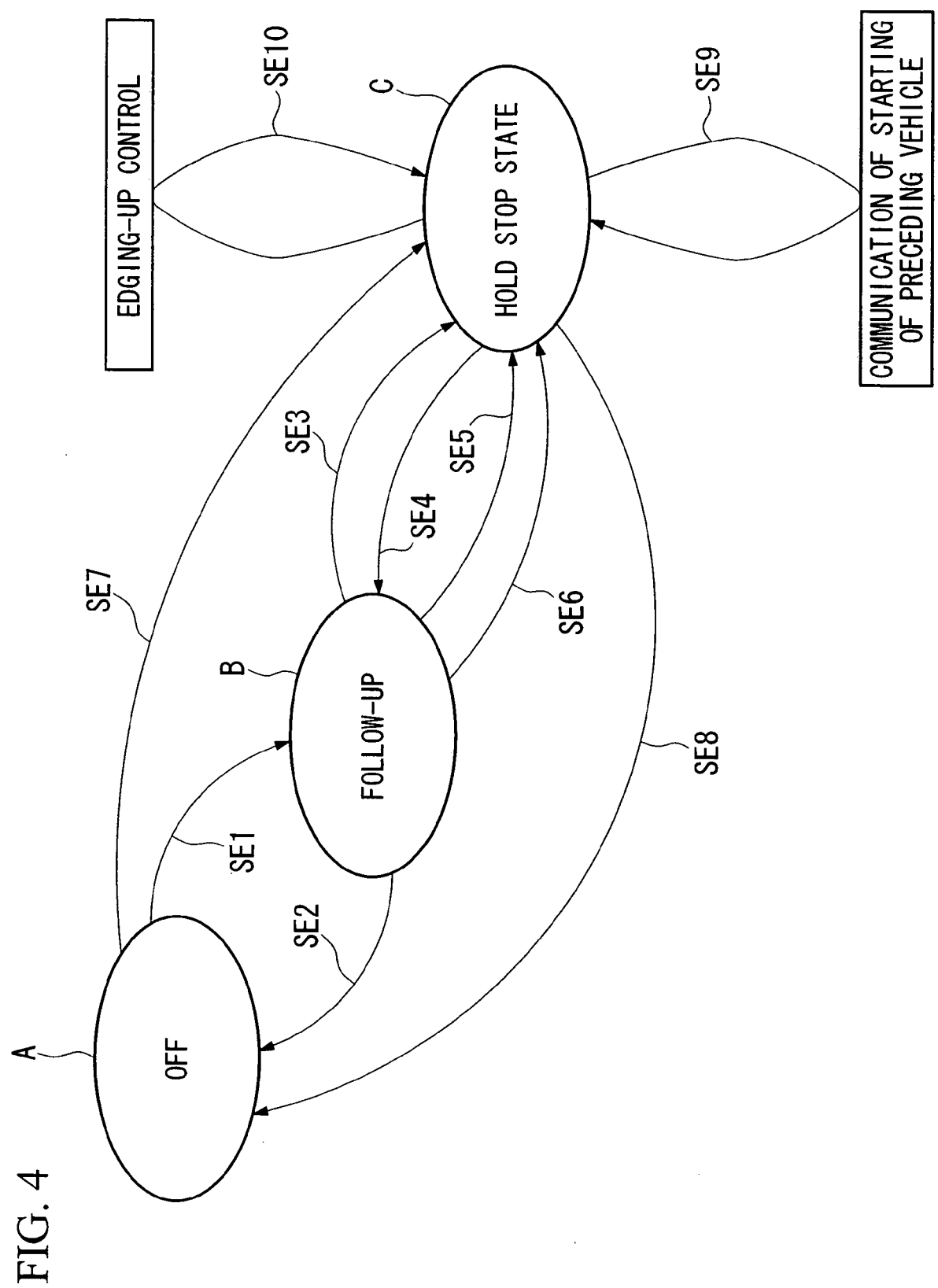
FIG. 4 is a diagram showing the state transition of the running control by the control state determining section of the follow running control system in the embodiment.

FIG. 4 is a diagram showing the state transition of the running control by the control state determining section 17. FIG. 4 shows three states A: OFF, B: FOLLOW-UP, and C: HOLD STOP STATE, as explained above. The first state OFF indicates a state when the running control by the follow running control system is not performed. The second state FOLLOW-UP indicates a state when the running control by the follow running control system is performed. The third state HOLD STOP STATE indicates a state in which after the preceding vehicle followed by the vehicle 1 is stopped, the vehicle 1 stops behind the preceding vehicle and holds the stopping state.

The control state determining section 17 changes the running control state as shown in FIG. 4, according to the input as explained below, which functions as a trigger.

When the present running control state is OFF (see reference symbol A in FIG. 4), if the preceding vehicle followed by the vehicle 1 is detected and the driver switches on the control starting switch 26, the control state determining section 17 changes the running control state from OFF to FOLLOW-UP (see reference symbols B and SE1 (which indicates a state transition) in FIG. 4).

When the present running control state is FOLLOW-UP, if the vehicle 1 loses the trail of the preceding vehicle, or the driver switches on the canceling switch 27 or depresses the brake pedal, the control state determining section 17 changes the running control state from FOLLOW-UP to OFF (see reference symbol SE2 (which also indicates a state transition)).

When the present running control state is FOLLOW-UP, if the preceding vehicle is stopped and the vehicle 1 stops behind the preceding vehicle and at a predetermined position, the control state determining section 17 changes the running control state from FOLLOW-UP to HOLD STOP STATE (see reference symbols C and SE3 (which also indicates a state transition)).

When the present running control state is in the HOLD STOP STATE, if the driver switches on the starting/stopping switch 25 or depresses the accelerator pedal, the control state determining section 17 changes the running control state from HOLD STOP STATE to FOLLOW-UP (see reference symbol SE4 (which also indicates a state transition)). That is, pushing of the starting/stopping switch 25 while in HOLD STOP STATE indicates the driver's intention to advance.

If the driver switches on the starting/stopping switch 25 in a predetermined time after the state transition from HOLD STOP STATE to FOLLOW-UP, the control state determining section 17 changes the running control state from FOLLOW-UP to HOLD STOP STATE (see reference symbol SE5 (which also indicates a state transition)). In this process, pushing of the starting/stopping switch 25 indicates the driver's intention to stop the vehicle.

If the preceding vehicle is not advancing by a predetermined time after the state transition from HOLD STOP STATE to FOLLOW-UP, the control state determining section 17 changes the running control state from FOLLOW-UP to HOLD STOP STATE (see reference symbol SE6 (which also indicates a state transition)).

When the present running control state is OFF and the preceding vehicle followed by the vehicle 1 is stopped and the vehicle 1 is also stopped behind the preceding vehicle, if the driver switches on the control starting switch 26, the control state determining section 17 directly changes the running control state from OFF to HOLD STOP STATE (see reference symbol SE7 (which also indicates a state transition)).

When the present running control state is in the HOLD STOP STATE, if the driver switches on the canceling switch 27 or depresses the brake pedal, the control state determining section 17 directly changes the running control state from the HOLD STOP STATE to OFF (see reference symbol SE8 (which also indicates a state transition)).

When the present running control state is in the HOLD STOP STATE, if starting of the preceding vehicle is detected, the control state determining section 17 informs the driver of the starting of the preceding vehicle via the communicating section 12 (see reference symbol SE9 (which also indicates a state transition)).

When the present running control state is in the HOLD STOP STATE and the distance between the stopped vehicle 1 and the stopped preceding vehicle (i.e., a stationary vehicular gap) is greater than a minimum target stop distance which is determined for prohibiting the vehicle 1 from approaching the preceding vehicle, if the driver switches on the starting/stopping switch 25 or depresses the accelerator pedal, the control state determining section 17 performs "edging-up control" while keeping the present HOLD STOP STATE (see reference symbol SE10 (which also indicates a state transition)).

The edging-up control and the running control from HOLD STOP STATE in which the vehicle 1 is stopped will be explained below.

Edging-Up Control of Vehicle 1

The edging-up control of the vehicle 1 by the control state determining section 17 will be explained by referring to the drawings.

Figure 5:
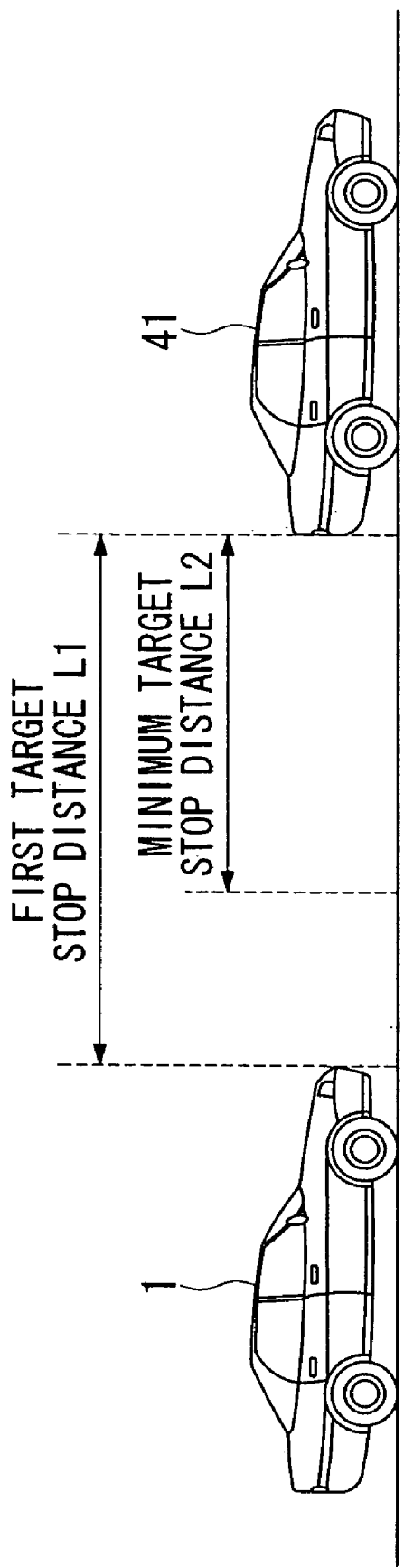
FIG. 5 is a diagram showing the stopping position of the vehicle in which the follow running control system in the embodiment is provided, with respect to the stopped preceding vehicle.

FIG. 5 is a diagram showing the stopping position of the vehicle 1 with respect to the stopped preceding vehicle. As shown in FIG. 5, when the preceding vehicle 41 is stopped, the vehicle 1 stops with the first target stop distance L1 (e.g., L1=5m), and after that, the control state determined by the control state determining section 17 is set to HOLD STOP STATE. Regarding distance 1, the minimum target stop distance L2 (L2<L1, e.g., L2=4 m) is determined for prohibiting the vehicle 1 from further approaching the preceding vehicle 41.

In FIG. 5, when the distance between the stopped vehicle 1 and the stopped preceding vehicle 41 (i.e., the stationary vehicular gap) is greater than the minimum target stop distance L2 and the control state determined by the control state determining section 17 is HOLD STOP STATE, if the starting/stopping switch 25 is switched on, the control state determining section 17 makes the vehicle 1 advance by a predetermined distance L3 (e.g., L3=0.5 m). Accordingly, the distance between the vehicle 1 and the preceding vehicle 41 is slightly decreased.

The above control, performed by the control state determining section 17 when the stationary vehicular gap is greater than the minimum target stop distance L2, for making the vehicle 1 advance by the predetermined distance L3 is called "edging-up control" in this embodiment. For example, the above first target stop distance L1 is longer than an average distance between stopped vehicles driven by ordinary drivers; thus, the driver of the vehicle 1 may feel uncomfortable due to a crowded state in traffic situations around the vehicle 1. In such a case, the edging-up control for decreasing the stationary vehicular gap to the minimum target stop distance L2 is effective.

After the stationary vehicular gap reaches the minimum target stop distance L2, even when the starting/stopping switch 25 is further pushed (i.e., switched) on, the running control state determined by the control state determining section 17 is maintained at the HOLD STOP STATE and the brake is not released. In addition, if the preceding vehicle 41 starts during the edging-up control, the control state determining section 17 changes the running control state from HOLD STOP STATE to FOLLOW-UP without informing the driver via the communicating section 12 of the starting of the preceding vehicle.

Running Control from HOLD STOP STATE in which the Vehicle 1 is Stopped

Next, the running control operation from HOLD STOP STATE in which the vehicle 1 is stopped will be explained by referring to the drawings, where the operation includes the above-explained edging-up control.

Figure 6:
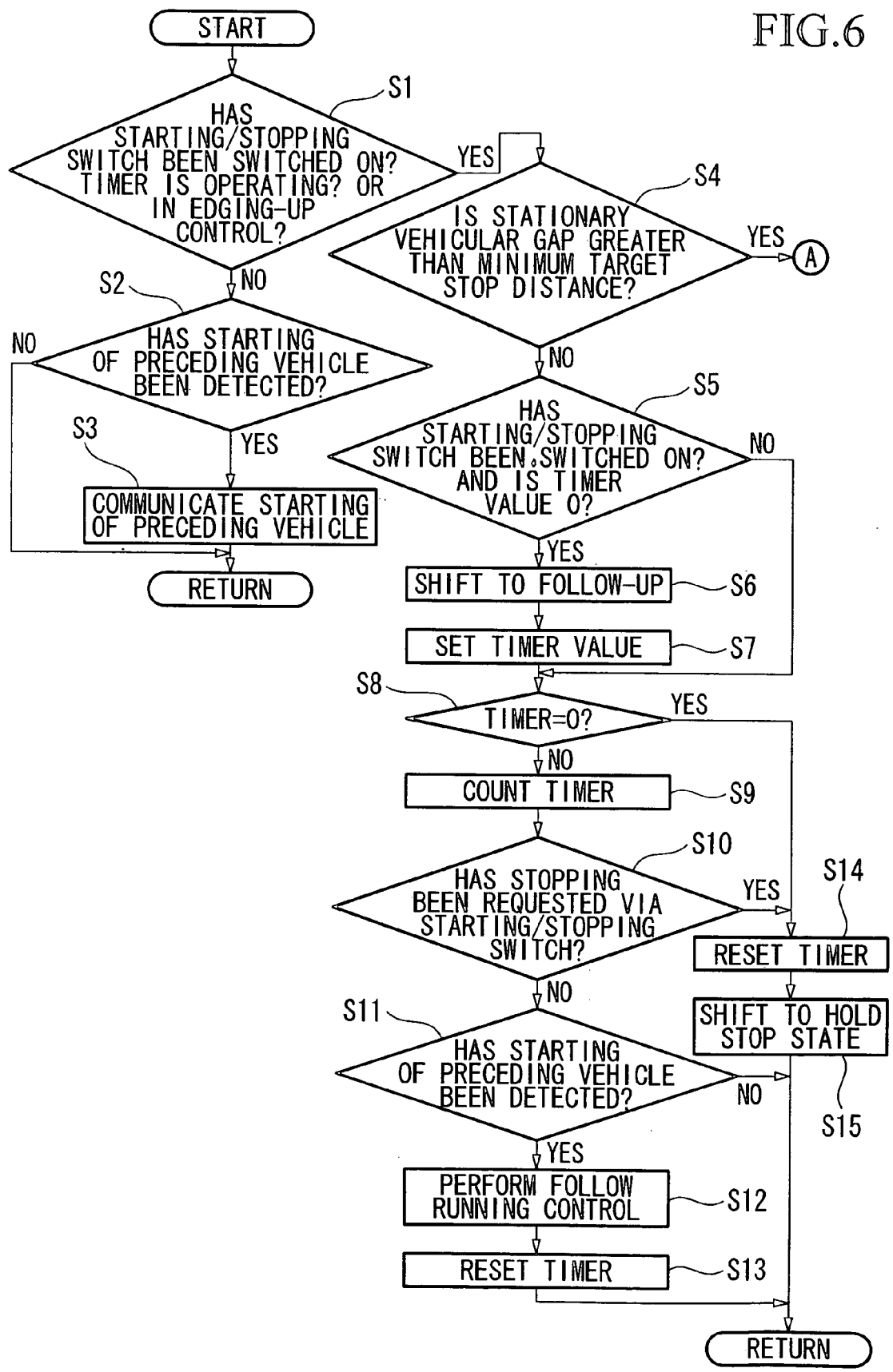
FIG. 6 is a flowchart of the running control operation from HOLD STOP STATE in which the vehicle is stopped, where the control operation is performed by the control state determining section of the follow running control system in the embodiment.
Figure 7:
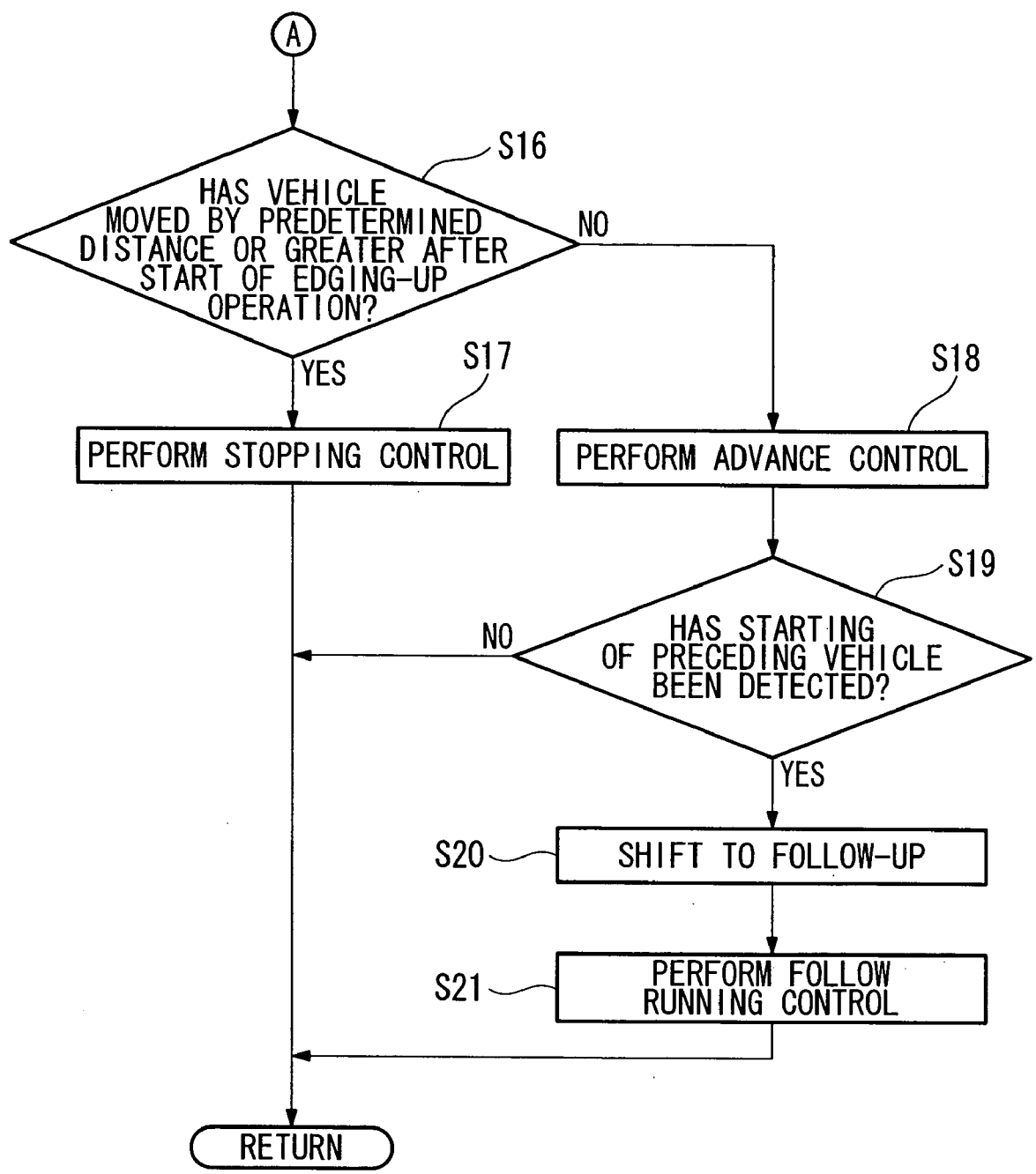
FIG. 7 is also a flowchart of the running control operation from HOLD STOP STATE in which the vehicle is stopped, where the control operation is performed by the control state determining section of the follow running control system in the embodiment.

FIGS. 6 and 7 show flowcharts of the running control operation from HOLD STOP STATE in which the vehicle 1 is stopped, where the control operation is performed by the control state determining section 17. While the vehicle 1 follows the preceding vehicle 41 and is stopped, the control state determining section 17 is activated and performs the operation shown in FIGS. 6 and 7 at regular intervals.

In FIG. 6, the control state determining section 17 is activated at regular intervals and determines whether the starting/stopping switch 25 has been switched on, or a timer (explained below) is operating, or the vehicle 1 is controlled by the edging-up control (see step S1). If none of the above three conditions is confirmed, that is, the starting/stopping switch 25 has not been switched on, the timer is not operating, and the vehicle 1 is not in the edging-up control state (see NO of step S1), the control state determining section 17 determines whether starting of the preceding vehicle 41 has been detected (see step S2).

If it is determined in step S2 that the starting of the preceding vehicle 41 has not been detected (see NO of step S2), the control state determining section 17 terminates the control operation of this time. If it is determined in step S2 that the starting of the preceding vehicle 41 has been detected (see YES of step S2), the control state determining section 17 informs the driver of the starting of the preceding vehicle 41 via the communicating section 12 to the driver, by using the indicator 8 or the buzzer 9 (see step S3).

If any one of the three conditions is satisfied in step S1, that is, the starting/stopping switch 25 has been switched on, or the timer is operating, or the vehicle 1 is in the edging-up control state (see YES of step S1), the control state determining section 17 determines whether the distance between the stopped vehicle 1 and preceding vehicle 41 (i.e., the stationary vehicular gap) is greater than the minimum target stop distance L2 (see step S4).

In step S4, if the stationary vehicular gap is equal to or less than the minimum target stop distance L2 (see NO of step S4), the control state determining section 17 performs reserved starting control in which it is first determined whether the starting/stopping switch 25 has been switched on and the value of the timer is zero (see step S5).

In step S5, if the starting/stopping switch 25 has been switched on and the value of the timer is zero (see YES of step S5), the control state determining section 17 changes the running control state (i.e., makes a state transition as explained above by referring to FIG. 4) to FOLLOW-UP (see step S6).

After this state transition to FOLLOW-UP, the control state determining section 17 sets the timer value, for example, to 2 seconds (see step S7) and monitors whether the preceding vehicle 41 is started in 2 seconds counted by the timer. More specifically, the control state determining section 17 first determines whether the timer value is zero (see step S8), and if the timer value is not zero (see NO of step S8), subtraction of the timer value is performed so as to perform counting of the timer (see step S9).

If the starting/stopping switch 25 has been switched on but the timer value is not zero in step S5, or if the timer value is zero but the starting/stopping switch 25 has not been switched on (see NO of step S5), the control state determining section 17 determines whether the timer value is zero (see step S8). If the timer value is not zero (see NO of step S8), subtraction of the timer value is performed so as to perform counting of the timer (see step S9).

In the above process, the control state determining section 17 monitors whether the driver, who does not want to start the vehicle 1 and follow the preceding vehicle 41 even when the preceding vehicle 41 is started, has switched on the starting/stopping switch 25, that is, input a stopping request (see step S10).

If the driver has not switched on the starting/stopping switch 25 and not input the stopping request (see NO of step S10), the control state determining section 17 next determines whether starting of the preceding vehicle 41 has been detected (see step S11).

If it is determined in step S11 that starting of the preceding vehicle 41 has been detected (see YES in step S11), the control state determining section 17 makes the vehicle 1 start and follow up the preceding vehicle 41 without informing the driver via the communicating section 12 of the starting of the preceding vehicle 41, and starts the follow running control (see step S12).

The control state determining section 17 then resets the timer value, that is, sets the timer value to zero (see step S13), and terminates the control operation of the present turn. In the above case, the vehicle 1 starts running; thus, the running control operation from HOLD STOP STATE (in which the vehicle 1 is stopped) is terminated.

If it is determined in step S8 that the timer value is zero (see YES of step S8) or if it is determined in step S10 that the driver has switched on the starting/stopping switch 25 and thus input a stopping request (see YES of step S10), the control state determining section 17 resets the timer value (i.e., sets the timer value to zero) (see step S14) and changes the running control state from FOLLOW-UP (which was determined in step S6) to HOLD STOP STATE (see step S15). The control state determining section 17 then terminates the control operation of the present turn.

If it is determined in step S4 that the stationary vehicular gap is greater than the minimum target stop distance L2 (see YES of step S4), the control operation shifts to step S16 in FIG. 7. The control state determining section 17 starts edging-up operation as the edging-up control and then determines whether the vehicle 1 has moved by the predetermined distance L3 or more (see step S16).

If the edging-up operation has been performed and the vehicle 1 has moved by the predetermined distance L3 or more (see YES of step S16), the control state determining section 17 performs stopping control in which the brake fluid pressure determining section 15 and the brake control section 14 are controlled and the brake actuator 6 is activated, so as to stop the vehicle 1 (see step S17).

If the edging-up operation has been performed but the vehicle 1 is still stopped or has not moved by the predetermined distance L3 or more (see NO of step S16), the control state determining section 17 performs advance control in which the throttle control section 13 is controlled, so as to activate the throttle actuator 5 and advance the vehicle 1 (see step S18).

During the edging-up control, the control state determining section 17 confirms whether starting of the preceding vehicle 41 has been detected (see step S19). If starting of the preceding vehicle 41 has not been detected (see NO of step S19), the control state determining section 17 terminates the control operation of the present turn.

If it is determined in step S19 that the starting of the preceding vehicle 41 has been detected (see YES of step S19), the control state determining section 17 shifts the running control state to FOLLOW-UP (see step S20).

The control state determining section 17 then starts the follow running control by making the vehicle 1 follow up the preceding vehicle 41 and starting running of the vehicle 1, without informing the driver of the starting of the preceding vehicle 41 via the communicating section 12 (see step S21) and terminates the control operation of the present turn. Also in this case, running of the vehicle 1 is started, and thus the running control operation from HOLD STOP STATE (in which the vehicle 1 is stopped) is terminated.

In the above running control, even when the running control state is HOLD STOP STATE, if the distance between the stopped the vehicle 1 and the stopped preceding vehicle 41 (i.e., the stationary vehicular gap) is greater than the minimum target stop distance L2 determined for prohibiting the vehicle 1 from approaching the preceding vehicle 41 and the driver switches on the starting/stopping switch 25 or depresses the accelerator pedal, the control state determining section 17 performs the edging-up control while keeping the HOLD STOP STATE. However, when the driver depresses the accelerator pedal so as to start the vehicle 1, even if the stationary vehicular gap is equal to or less than the minimum target stop distance L2, the driver's intention is given priority and the brake is released, so that running of the vehicle 1 is handled by the driver's operation.

In the above explanations for steps S1 to S21, in particular, in steps S1, S5, and S10, the driver's desire to start or stop the vehicle is confirmed by referring to the on/off state of the starting/stopping switch 25; however, the driver's request for starting the vehicle may be confirmed by referring to the driver's operation of the accelerator pedal.

In the above-explained running control, it is monitored in step S10 whether the driver, who does not want to start the vehicle 1 and follow the preceding vehicle 41, has switched on the starting/stopping switch 25, that is, input a stopping request. However, after step S12 for making the vehicle 1 starting and follow the preceding vehicle 41, it may be monitored whether the driver, who does not want to run the vehicle 1 and follow the preceding vehicle 41, has switched on the starting/stopping switch 25 and input a stopping request.

In the above embodiment, the function of the communication device of the present invention includes not only the operation of the communicating section 12 but also the operation of steps S2 and S3, performed by the control state determining section 17.

As explained above, the follow running control system of the present embodiment has the radar apparatus 11 which can detect objects in the advance direction of the vehicle 1, determines the preceding vehicle 41 to be followed by the vehicle 1 among the detected objects, and performs follow running control with respect to the determined preceding vehicle 41. When the vehicle 1 is controlled in the stopping control, if driver's driving operation for requesting the starting of the vehicle via the starting/stopping switch 25 or the accelerator pedal is detected, the control state determining section 17 changes the control state of the vehicle 1, with respect to the target speed determining section 19, the throttle control section 13, the brake control section 14, and the brake fluid pressure determining section 15, from the stop control to the follow control, regardless of starting of the preceding vehicle 41.

Therefore, follow control while giving the driver's driving operation priority is possible. Accordingly, a stand-by state is realized in which follow control is possible for the starting of the preceding vehicle; thus, at the same time the preceding vehicle starts, the vehicle 1 can be smoothly started by making the vehicle 1 follow the preceding vehicle 41.

Therefore, a difference in driving sensation between running of the vehicle by the driver's natural operation and follow running by the follow running control system is reduced, and it is possible to realize a follow running control system by which the driver does not feel uncomfortable.

In addition, when the starting of the preceding vehicle 41 is detected, the communication device communicates the starting, thereby urging the driver to input (indication of) the next driving operation. Therefore, even if the driver does not recognize changes in traffic situations around the present vehicle, the driver, informed of the starting of the preceding vehicle, can be urged to input the next driving operation. On the other hand, if the next driving operation for requesting starting of the vehicle is input by the driver in a predetermined time period, the operation of urging the driver to input the next driving operation is stopped. Accordingly, when the driver recognizes changes in traffic situations around the present vehicle, the vehicle 1 can be controlled without inconveniencing the driver.

Even when the driver performed a driving operation of requesting starting of the vehicle, if the preceding vehicle 41 is not started, the control state of the vehicle 1 is returned to the stop control. Therefore, even when the driver has the intention of starting the vehicle, if the preceding vehicle 41 is not started, the stopping state of the vehicle 1 is maintained, thereby realizing a follow running control system for appropriately making the vehicle 1 run in accordance with traffic situations around the vehicle.

Even when follow control for following the preceding vehicle 41 is possible, if the vehicle 1 cannot be started to follow the preceding vehicle 41, the stopping state of the vehicle 1 is maintained based on the driving operation (i.e., indication) by the driver. Accordingly, the operation of the driver is given priority, and it is possible to realize a follow running control system by which the driver does not feel uncomfortable.

In addition, the driver can input the driving operation with no stress by using switches provided close to the steering wheel, and the preceding vehicle 41 can be accurately recognized via simple processing performed by the running locus computing unit, thereby realizing a small-sized follow running control system, appropriately provided in the vehicle, for accurately following the preceding vehicle 41 with less power consumption.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A follow running control system comprising:
    an object detecting device, provided in a present vehicle, for detecting objects in an advance direction of the present vehicle;
    a preceding vehicle determining device for determining a preceding vehicle to be followed by the present vehicle from among the detected objects;
    a target vehicular gap determining device for determining a target vehicular gap between the present vehicle and the preceding vehicle;
    a target speed determining device for determining a target speed of the present vehicle based on a signal from the object detecting device and the target vehicular gap;
    a follow running control device for controlling follow running of the present vehicle based on the determined target speed;
    a preceding vehicle starting detecting device for detecting starting of the preceding vehicle based on a signal from the object detecting device;
    a driving operation detecting device for detecting a driving operation performed by a driver of the present vehicle;
    a running control section for performing running control of the present vehicle based on data of the preceding vehicle and a signal from the driving operation detecting device, wherein if a driving operation by the driver for requesting starting of the present vehicle is detected while the present vehicle is stopped in a stop control state, the running control section changes a control state of the present vehicle, with respect to the follow running control device, from the stop control state to a follow control state for following the preceding vehicle, regardless of starting of preceding vehicle, and wherein if the starting of the preceding vehicle is not detected in a predetermined time after the change of the control state of the present vehicle from the stop control state to the follow control state, the running control section changes the control state of the present vehicle from the follow control state to the stop control state.

2. A follow running control system as claimed in claim 1, further comprising a communicating device for communicating starting of the preceding vehicle if the starting of the preceding vehicle is detected while the present vehicle is stopped in the stop control state.

3. A follow running control system as claimed in claim 2, wherein even if the starting of the preceding vehicle is detected while the present vehicle is stopped in the stop control state, the communicating device prohibits communicating the starting of the preceding vehicle in a predetermined time period after the driving operation by the driver for requesting starting of the present vehicle is detected.

4. A follow running control system as claimed in claim 1, wherein:
    the driving operation detecting device has an operation device for selectively inputting either a driving operation for requesting starting or a driving operation for requesting stopping according to the control state of the present vehicle; and
    the running control section changes the control state of the present vehicle from the follow control state to the stop control state if the driving operation for requesting stopping is input via the operation device by the driver in a predetermined time after the change of the control state of the present vehicle from the stop control state to the follow control state.

5. A follow running control system as claimed in claim 1, wherein the driving operation detecting device detects the driving operation performed by the driver based on a signal from a switch provided close to a steering wheel of the present vehicle.

6. A follow running control system as claimed in claim 1, further comprising:
    a speed measuring device for measuring a speed of the present vehicle;
    a yaw rate measuring device for measuring a yaw rate of the present vehicle; and a running locus computing device for computing a running locus of the present vehicle based on signals output from the speed measuring device and the yaw rate measuring device, wherein:

the preceding vehicle determining device determines the preceding vehicle based on signals from the object detecting device and the running locus computing device.

7. A follow running control system as claimed in claim 1, wherein the follow running control system allows the present vehicle to move a first predetermined distance in the advance direction to decrease the distance between the present and preceding vehicles if:

the running control section changes the control state to the stop control state;

a detected distance between the present and preceding vehicles is greater than a minimum target stop distance; and the driving operation detection device detects an edging-up operation by the driver of the present vehicle.

8. A follow running control system as claimed in claim 7, wherein the edging-up operation comprises switching on a starting/stopping switch.

9. A follow running control system as claimed in claim 7, wherein the edging-up operation comprises depressing an accelerator pedal.

10. A method for controlling a vehicle comprising:

detecting objects in an advance direction of a present vehicle;

determining a preceding vehicle to be followed from among detected objects;

determining a target vehicular gap between the present vehicle and the preceding vehicle;

determining a target speed of the present vehicle based on the target vehicular gap;

controlling follow running of the present vehicle based on the determined target speed;

detecting starting of the preceding vehicle from a stopped condition;

detecting a driving operation performed by a driver of the present vehicle;

performing running control of the present vehicle, wherein if a driving operation by the driver for requesting starting of the present vehicle is detected while the present vehicle is stopped in a stop control state, changing a control state of the present vehicle from the stop control state to a follow control state for following the preceding vehicle, regardless of starting of the preceding vehicle, and wherein if the starting of the preceding vehicle is not detected in a predetermined time after the change of the control state from the stop control state to the follow control state, changing the control state of the present vehicle from the follow control state to the stop control state.

11. The method of claim 10, further comprising communicating starting of the preceding vehicle if the starting of the preceding vehicle is detected while the present vehicle is stopped in the stop control state.

12. The method of claim 10, wherein even if the starting of the preceding vehicle is detected while the present vehicle is stopped in the stop control state, prohibiting the communicating of the starting of the preceding vehicle in a predetermined time period after detecting the requesting starting of the present vehicle.

13. The method of claim 10, wherein detecting the driving operation further comprises selectively inputting either a driving operation for requesting starting or a driving operation for requesting stopping according to the control state of the present vehicle; and wherein performing running control further comprises changing the control state of the present vehicle from the follow control state to the stop control state if the driving operation for requesting stopping is received in a predetermined time after the change of the control state of the present vehicle from the stop control state to the follow control state.

14. The method of claim 10, further comprising allowing the present vehicle to move a first predetermined distance in the advance direction to decrease the distance between the present and preceding vehicles if:

the control state is changed to the stop control state;

a detected distance between the present and preceding vehicles is greater than a minimum target stop distance; and an edging-up operation by the driver of the present vehicle is detected.

15. The method of claim 14, wherein detecting an edging-up operation comprises detecting that a starting/stopping switch has been switched on.

16. The method of claim 14, wherein detecting an edging-up operation comprises detecting that an accelerator pedal has been depressed.

17. A control system for a present vehicle, comprising:

a preceding vehicle sensor adapted to detect a preceding vehicle in an advance direction of the present vehicle and determine a vehicular gap between the present vehicle and the preceding vehicle;

a vehicle operation sensor adapted to detect a driving operation performed by a driver of the present vehicle; and a vehicle control unit having a processor operatively coupled to the preceding vehicle sensor and the vehicle operation sensor, the vehicle control unit being adapted to execute instructions responsive to signals received from the preceding vehicle sensor and the vehicle operation sensor, the instructions including:

determining a target speed of the present vehicle based on the vehicular gap;

controlling follow running of the present vehicle based on the determined target speed and a control state of the present vehicle;

detecting starting of the preceding vehicle; and selecting the control state of the present vehicle, wherein if the vehicle operation sensor detects a request for starting the present vehicle while the present vehicle is stopped in a stop control state, changing from the stop control state to a follow control state for following the preceding vehicle, regardless of the starting of the preceding vehicle, and wherein if vehicle operation sensor does not detect the starting of the preceding vehicle in a predetermined time after the change of the control state from the stop control state to the follow control state, changing the control state of the present vehicle from the follow control state to the stop control state.

18. The control system of claim 17, further comprising a communicating unit operatively coupled to the control unit and adapted to communicate to the driver starting of the preceding vehicle if the starting of the preceding vehicle is detected while the present vehicle is stopped in the stop control state.

19. The control system of claim 18, wherein even if the starting of the preceding vehicle is detected while the present vehicle is stopped in the stop control state, the communicating unit prohibits communicating the starting of the preceding vehicle in a predetermined time period after detecting the driving operation by the driver for requesting starting of the present vehicle.

20. The control system of claim 17, wherein the vehicle operation sensor is adapted to receive at least one of a first input signal requesting starting of the present vehicle and a second input signal requesting stopping of the present vehicle.

21. The control system of claim 20, wherein the control state is changed from the follow control state to the stop control state if the second input for requesting stopping is received in a predetermined time after the change of the control state from the stop control state to the follow control state.

22. The control system of claim 20, wherein the vehicle operation sensor further includes a switch provided close to a steering wheel of the present vehicle, the switch adapted to provide at least one of the first and second input signals.

23. The control system of claim 20, further comprising a vehicle speed sensor adapted to measure a speed of the present vehicle, a yaw rate sensor adapted to measure a yaw rate of the present vehicle, and a running locus computing unit adapted to compute a running locus of the present vehicle based on the measured speed and yaw rate, wherein the preceding vehicle sensor identifies the preceding vehicle based in part on the computed running locus.

24. The control system of claim 17, wherein the instructions further include allowing the present vehicle to move a first predetermined distance in the advance direction to decrease the distance between the present and preceding vehicles if:

the control state is changed to the stop control state;

a detected distance between the present and preceding vehicles is greater than a minimum target stop distance; and an edging-up operation by the driver of the present vehicle is detected.

25. The control system of claim 24, wherein detecting an edging-up operation comprises detecting that a starting/stopping switch has been switched on.

26. The control system of claim 24, wherein detecting an edging-up operation comprises detecting that an accelerator pedal has been depressed.

* * * * *